UNITED STATES PATENT OFFICE.

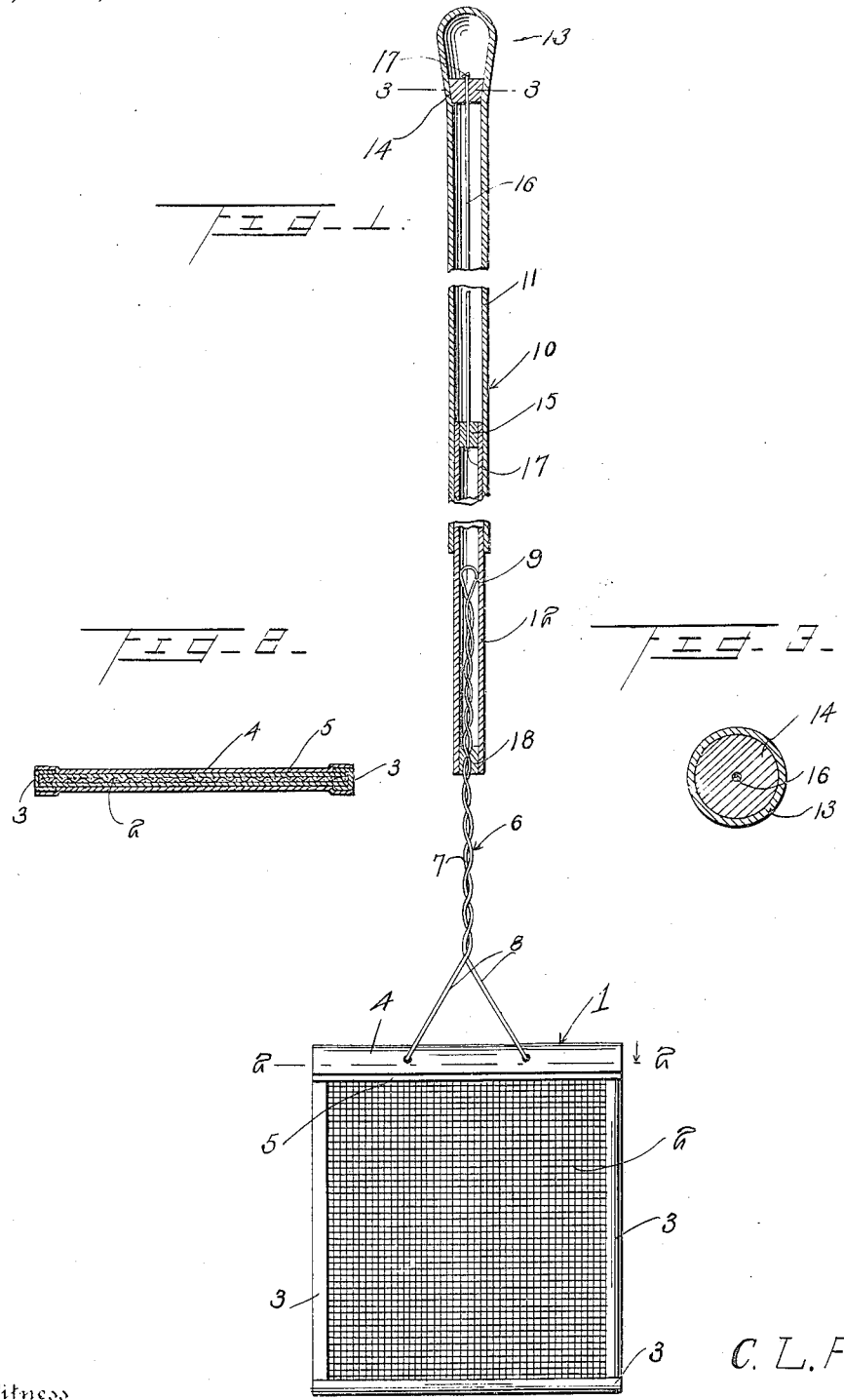

CLARENCE L. FERGUSON, OF GEORGETOWN, MASSACHUSETTS, ASSIGNOR OF ONE-HALF TO WILLIAM P. R. ESTES, JR., OF HAVERHILL, MASSACHUSETTS.

FLY-SWATTER.

1,214,446.　　　　　Specification of Letters Patent.　　Patented Jan. 30, 1917.

Application filed July 8, 1916. Serial No. 108,195.

*To all whom it may concern:*

Be it known that I, CLARENCE L. FERGUSON, a citizen of the United States, residing at Georgetown, in the county of Essex and State of Massachusetts, have invented certain new and useful Improvements in Fly-Swatters; and I do hereby declare the following to be a full, clear, and exact description of the invention, such as will enable others skilled in the art to which it appertains to make and use the same.

This invention relates to new and useful improvements in fly swatters and the principal object of the invention is to provide a device having an extensible handle which will allow the user to reach heretofore inaccessible places.

Another object of the invention is to provide a novel means for limiting the extensibility of the handle of the device in order to avoid accidental disassembling of the same.

A still further object of the invention is to provide a novel means for reinforcing the edges of the swatter and to protect the same so as to avoid injury to furniture or the like.

With these and other objects in view, the invention consists in the novel combination and arrangement of parts which will be fully set forth in the following specification and accompanying drawing, in which:—

Figure 1 is a view of a fly swatter showing the handle in section. Fig. 2 is a sectional view on line 2—2 of Fig. 1, and Fig. 3 is a sectional view on line 3—3 of Fig. 1.

Referring to the drawing by characters of reference the numeral 1 designates as an entirety a fly swatter consisting of a body of screen wire designated by the numeral 2 which is bound on its free edges with suitable strips of leather or felt 3. The attached edge of the body 2 is bound with a strip of tin 4 and a suitable leather 5 is attached to opposite sides of the tin so as to prevent the same from coming in contact with furniture and the like. The handle of the device is designated generally by the numeral 6 and consists of the inter-twisted stem 7 provided with the diverging arms 8 at one end which are extended through openings in the tin binding 4 and bent in such a manner as to rigidly hold the body 2 in operative relation with the handle 6. The stem 7 of the handle is provided at the end opposite the arms 8 with the loop 9 the use of which will appear as the description proceeds.

The extensible handle is designated generally by the numeral 10 and consists of a tube 11 in which the tube 12 is slidably mounted. This tube 12 is of such a diameter as to frictionally engage the inner wall of the tube 10 and the loop 9 on the stem 7 frictionally engages the inner wall of the tube 12 so it will thus be seen that the length of the handle may be adjusted and will remain so until manually moved. A suitable enlargement 13 is formed on the handle end of the tube 11 and a plug 14 is fitted within said tube and secured therein in any suitable manner. A similar plug 15 is fitted within the end of the tube 12 and these plugs are provided with central openings for the reception of the flexible member 16 which is provided with knots 17 at its opposite end for limiting the outward movement of the tube 12 with relation to the tube 11. A plug 18 is fitted in the end of the tube 12 opposite the plug 15 and is formed with a central opening through which the stem 7 of the handle 6 extends and it will thus be seen that the handle will be held centered with relation to the tubes 11 and 12.

It will be apparent from the foregoing that in use the device is used in the ordinary way and when it is desired to do so the handle may be extended in the manner illustrated in the drawing and it will be evident that places which are ordinarily out of reach will thus be readily accessible.

While in the foregoing there has been shown and described the preferred embodiment of this invention, it is to be understood that such changes may be made in the combination and arrangement of parts as will fall within the spirit and scope of the appended claim.

What is claimed is:—

A fly swatter comprising a body, a handle on the body, a resilient loop at the free end of the handle, an extensible handle consisting of a pair of relatively slidable tubes one fitted within the other, the loop being adapted to fit in the smaller tube, a stop plug having a central opening therein at the outer end of the smaller tube, said opening being adapted to receive the handle of the swatter, a plug fitted within the inner end of the smaller tube, a plug in the handle end of the larger tube and a flexible member connecting the last named plug to limit the outward movement of the first mentioned tube with the second tube.

In testimony whereof I affix my signature in presence of two witnesses.

CLARENCE L. FERGUSON.

Witnesses:
EDMOND LENIRE,
WILLIAM P. R. ESTES, Jr.